US011698317B2

(12) United States Patent
Zabulon et al.

(10) Patent No.: US 11,698,317 B2
(45) Date of Patent: Jul. 11, 2023

(54) DEVICE FOR MEASURING TIRE PRESSURE WITHOUT A BATTERY

(71) Applicants: SAFRAN LANDING SYSTEMS, Velizy Villacoublay (FR); SAFRAN ELECTRONICS & DEFENSE, Boulogne-Billancourt (FR)

(72) Inventors: Joel Zabulon, Moissy-Cramayel (FR); Didier Levavasseur, Moissy-Cramayel (FR)

(73) Assignees: SAFRAN LANDING SYSTEMS, Velizy Villacoublay (FR); SAFRAN ELECTRONICS & DEFENSE, Boulogne-Billancourt (FR)

( * ) Notice: Subject to any disclaimer, the term of this patent is extended or adjusted under 35 U.S.C. 154(b) by 269 days.

(21) Appl. No.: 17/282,529

(22) PCT Filed: Oct. 2, 2019

(86) PCT No.: PCT/EP2019/076783
§ 371 (c)(1),
(2) Date: Apr. 2, 2021

(87) PCT Pub. No.: WO2020/070232
PCT Pub. Date: Apr. 9, 2020

(65) Prior Publication Data
US 2021/0348978 A1    Nov. 11, 2021

(30) Foreign Application Priority Data
Oct. 5, 2018   (FR) ..................................... 18 59256

(51) Int. Cl.
*B60C 23/04*        (2006.01)
*G01L 17/00*        (2006.01)
(Continued)

(52) U.S. Cl.
CPC .......... *G01L 17/00* (2013.01); *B60C 23/0428* (2013.01); *B60C 23/0432* (2013.01);
(Continued)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| 11,247,515 | B2 * | 2/2022 | Larsen ................ B60C 23/0494 |
| 11,578,998 | B2 * | 2/2023 | Ge ........................... G01D 5/20 |
| 2009/0013773 | A1 | 1/2009 | Acker |

FOREIGN PATENT DOCUMENTS

| CN | 115515804 A | * 12/2022 | ......... B60C 23/0411 |
| DE | 699 07 375 T2 | 4/2004 | |

(Continued)

OTHER PUBLICATIONS

International Search Report for PCT/EP2019/076783 dated Dec. 3, 2019 (PCT/ISA/210).

*Primary Examiner* — Andre J Allen
(74) *Attorney, Agent, or Firm* — Sughrue Mion, PLLC

(57) ABSTRACT

A measurement device for measuring the pressure of a wheel (3) of a vehicle, the measurement device comprising a stationary portion (5) and a movable portion (14) for being driven in rotation by the wheel, the stationary portion including a first printed circuit (7) having at least one first track formed thereon defining a first winding, the movable portion including a second printed circuit (16) having at least one second track formed thereon defining a second winding, the second printed circuit being arranged to be connected to a pressure sensor (15), the first winding and the second winding being coupled together to form a wireless communication channel, the measurement device being (Continued)

arranged in such a manner that the pressure sensor is electrically powered by the stationary portion via the wireless communication channel, and in such a manner that uplink data comprising pressure measurement data is transmitted to the stationary portion (5) by the movable portion (14) via the wireless communication channel.

9 Claims, 4 Drawing Sheets

(51) Int. Cl.
    *G01B 7/30*     (2006.01)
    *G01D 5/20*     (2006.01)
    *G01P 3/48*     (2006.01)
    *G01L 19/08*     (2006.01)

(52) U.S. Cl.
    CPC ...... *B60C 23/0488* (2013.01); *B60C 23/0489* (2013.01); *G01B 7/30* (2013.01); *G01D 5/20* (2013.01); *G01L 19/086* (2013.01); *G01P 3/48* (2013.01)

(58) Field of Classification Search
CPC . B60C 23/0433; B60C 23/0493; B60C 19/00; B60C 23/04; B60C 23/041; B60C 23/0462; B60C 23/0411; B60C 23/20; B60C 23/0444; B60C 23/0479; B60C 11/24; B60C 23/064; B60C 23/007; B60C 23/062; B60C 23/0401; B60C 23/0413; B60C 23/0488; B60C 23/06; B60C 23/043; B60C 23/0452; B60C 23/0467; B60C 11/246; B60C 23/0498; B60C 23/02; B60C 99/006; B60C 23/0428; B60C 23/0442; B60C 23/009; B60C 2019/004; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 11/0318; B60C 23/0459; B60C 23/0471; B60C 23/0481; B60C 2019/005; B60C 23/002; B60C 23/042; B60C 2200/02; B60C 23/0422; B60C 23/0423; B60C 23/0466; B60C 23/0477; B60C 23/0405; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 23/0484; B60C 13/00; B60C 19/003; B60C 23/065; B60C 23/00336; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/0024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016;
G01M 5/0025; G01M 5/0083; G01M
7/022; G01M 7/025; G01M 7/04; G01M
7/06; G01M 9/02; G01M 9/04; G01M
99/002; G01M 99/004; G01M 3/002;
G01M 3/04; G01M 7/02; G01M 9/06
USPC .................................................. 73/146–146.8
See application file for complete search history.

(56) References Cited

FOREIGN PATENT DOCUMENTS

| | | | | |
|---|---|---|---|---|
| EP | 1 223 057 A2 | 7/2002 | | |
| EP | 1223056 A2 * | 7/2002 | ......... | B60C 23/0408 |
| GB | 2263976 A * | 8/1993 | ......... | B60C 23/0408 |
| WO | WO-03031210 A1 * | 4/2003 | ........... | B60C 23/043 |
| WO | WO-2004078495 A1 * | 9/2004 | ......... | B60C 23/0413 |
| WO | 2006/063970 A1 | 6/2006 | | |

* cited by examiner

DEVICE FOR MEASURING TIRE PRESSURE WITHOUT A BATTERY

CROSS REFERENCE TO RELATED APPLICATIONS

This application is a National Stage of International Application No. PCT/EP2019/076783 filed Oct. 2, 2019, claiming priority based on French Patent Application No. 18 59256 filed Oct. 5, 2018, the entire contents of each of which are herein incorporated by reference in their entireties.

The invention relates to the field of devices for measuring the pressure of a tire of a wheel mounted on an axle of a vehicle.

BACKGROUND OF THE INVENTION

A modern aircraft is conventionally fitted with a system for automatically monitoring the pressure that prevails in the tires of the wheels of the aircraft (this is also referred to as a "tire pressure monitoring system" (TPMS)). For each wheel, the monitoring system includes a pressure sensor situated on the wheel. The monitoring system also includes transmission means for transmitting pressure measurement data to the avionics, in order to provide a real-time display of the pressure of each wheel or else proper-operation information associated with each wheel.

One of the main difficulties with implementing such a pressure monitoring system lies in the fact that, for each wheel, the pressure measurement data needs to be transmitted from the pressure sensor, which rotates with the wheel, to the inside of the fuselage of the aircraft. The transmission means therefore cannot make use of transmission by wire. The transmission means therefore implement wireless transmission making use of radio waves to convey the pressure measurement data from the pressure sensor.

In order to power the pressure sensor and the transmission means, proposals have been made to provide the wheel with a battery that supplies electrical energy. Nevertheless, such a solution requires maintenance operations that are frequent, since provision must be made to replace the battery regularly before it discharges in order to avoid any interruption of service. Furthermore, battery use is difficult to make compatible with the temperatures likely to prevail in the proximity of an aircraft wheel (potentially both very high during certain braking operations, and also very low at altitude).

The pressure monitoring system must also co-exist with a system for measuring the angular speed of the wheels. Angular speed measurement data is used in particular to perform an anti-skid function.

Both of those two systems require equipment to be positioned in the proximity of the wheels.

Such equipment may be situated in particular inside the axles and at their ends. Integrating such equipment is complicated, since the available space is very small.

It is also appropriate to reduce the weight of the equipment as much as possible. Specifically, since an aircraft may have a relatively large number of wheels (e.g. 22 wheels for the Airbus A380), the total impact of the weight of such equipment is considerable.

OBJECT OF THE INVENTION

An object of the invention is to provide a device for measuring the pressure of a wheel that operates without a battery, that presents little weight, and that is suitable for being integrated effectively together with a device for measuring the angular speed of the wheel.

SUMMARY OF THE INVENTION

In order to achieve this object, there is provided a measurement device for measuring the pressure of a tire of a wheel mounted on an axle of a vehicle, the measurement device comprising a stationary portion for securing to the axle and a movable portion for being driven in rotation by the wheel, the stationary portion including a first printed circuit having at least one first track formed thereon defining a first winding, the movable portion including a second printed circuit having at least one second track formed thereon defining a second winding, the second printed circuit being arranged to be connected to a pressure sensor, the first winding and the second winding being coupled together electromagnetically to form a wireless communication channel, the measurement device being arranged in such a manner that the pressure sensor is electrically powered by the stationary portion via the wireless communication channel, and in such a manner that uplink data comprising pressure measurement data is transmitted to the stationary portion by the movable portion via the wireless communication channel.

In the measurement device of the invention, the pressure sensor is powered by the stationary portion via the wireless communication channel, so a battery is not necessary.

The windings of the wireless communication channel are defined by tracks formed on printed circuits, and they are therefore compact and not bulky.

It is also possible to define other tracks on the printed circuit to perform other functions, e.g. tracks serving to produce measurements of the angular speed of the wheel. The functions of measuring pressure and of measuring angular speed can thus both be integrated very effectively. In particular, these functions require little space and weight, the electrical and mechanical interfaces are simplified, and mechanical, electrical, and electromagnetic interference is under control.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
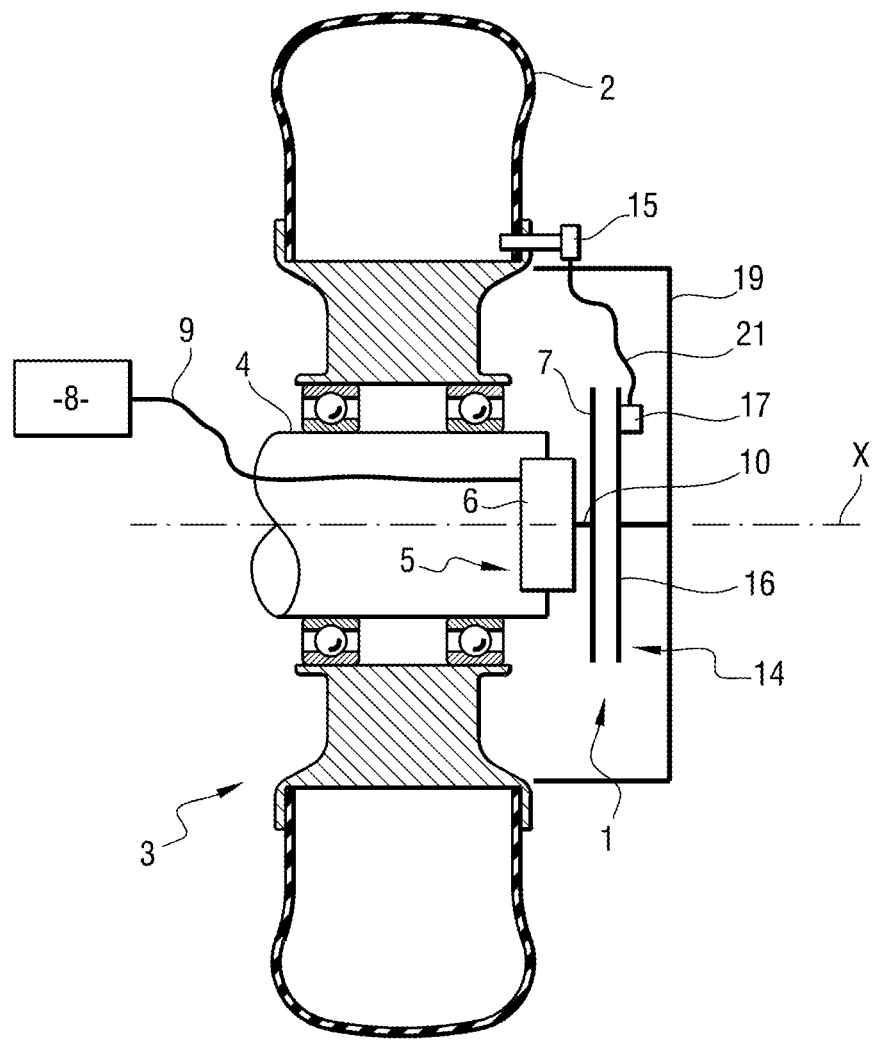
FIG. 1 shows an aircraft wheel and a measurement device of the invention.
Figure 2:
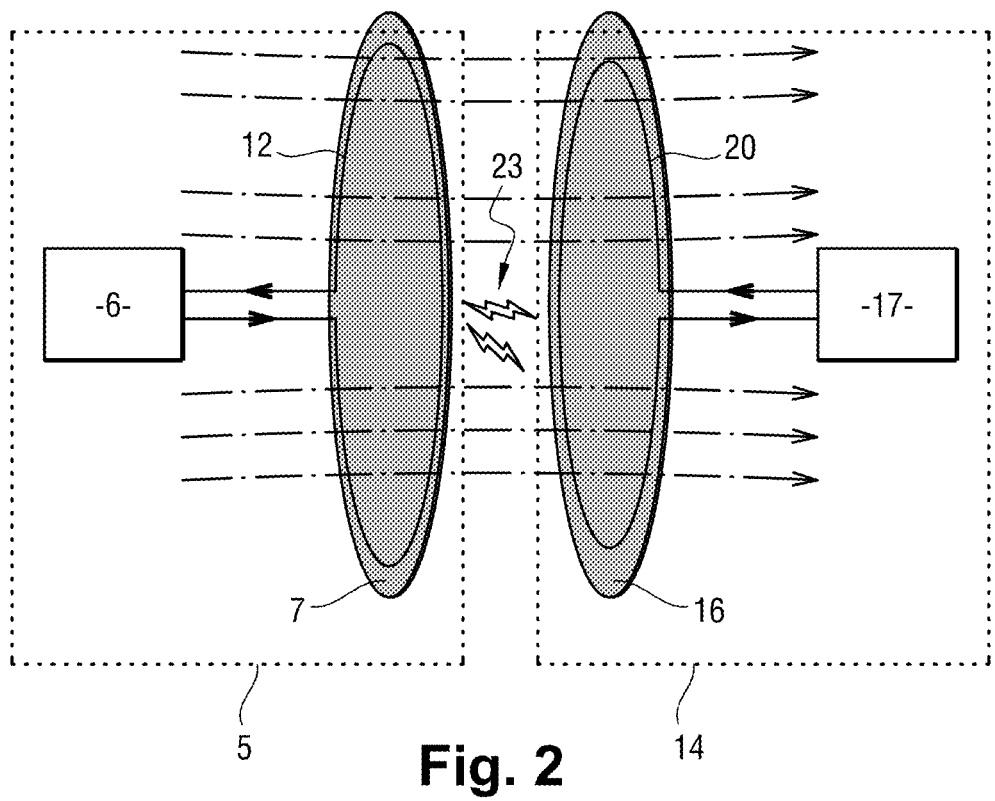
FIG. 2 shows a first winding, a second winding, a first processor unit, and a second processor unit of the measurement device of the invention.

With reference to FIGS. 1 and 2, the measurement device 1 of the invention is intended mainly to measure the pressure that prevails inside a tire 2 of a wheel 3 of an aircraft. The wheel 3 is mounted on an axle 4 situated at the bottom of an aircraft undercarriage.

The measurement device 1 includes a stationary portion 5 that is secured to the axle 4. The stationary portion 5 comprises a first processor unit 6 and a first printed circuit 7.

In this example, the first processor unit 6 is situated inside the axle 4, in the proximity of the end of the axle 4 and thus in the proximity of the wheel 3. The first processor unit 6 is connected to calculation means 8 (or to a data concentrator), situated inside the fuselage of the aircraft via a first cable 9 running in part inside the axle 4. The calculation means 8 forward or process the pressure measurement data produced by the measurement device 1, thereby enabling the pressure measurement data to be used for automatically monitoring the pressure of the tire 2 of the wheel 3. The first processor unit 6 includes in particular a first transceiver.

In this example, the first printed circuit 7 is annular in shape. The first printed circuit 7 is situated in the proximity of the end of the axle 4, in this example outside the axle 4 (but it could equally well be situated inside the axle 4). The first printed circuit 7 is connected by a second cable 10 to the first processor unit 6. The first printed circuit 7 is perpendicular to the axis of rotation X of the wheel 3 (and thus to the axis of the axle 4). The faces of the first printed circuit 7 are thus substantially parallel to the faces of the wheel 3.

A first track 12 is formed on the first printed circuit 7. In this example, the first track 12 is etched on the first printed circuit 7. The first track 12 defines a first winding the presents a first axis of revolution coinciding with the axis of rotation X of the wheel 3.

The first printed circuit 7 also includes one or more first capacitors connected in series or in parallel with the first winding. The first winding and the first capacitors form a first transmission circuit.

The measurement device 1 also includes a movable portion 14 that is to be driven in rotation by the wheel 3. The movable portion 14 comprises a pressure sensor 15, a second printed circuit 16, and a second processor unit 17.

The pressure sensor 15 is positioned on a rim of the wheel 3 and it is arranged to take measurements of the pressure that prevails inside the tire 2 of the wheel 3.

In this example, the second printed circuit 16 is annular in shape. The second printed circuit 16 is fastened to a wheel cover 19 serving in particular to protect the inside of the axle 4. When the wheel 3 is mounted on the axle 4 and the wheel cover 19 is mounted against the wheel 3, the second printed circuit 16 is situated at the end of the axle 4, in this example outside the axle 4 (but it could equally well be situated inside the axle 4 together with the first printed circuit 7), and it is arranged parallel to the first printed circuit 7. The first and second printed circuits 7 and 16 are situated facing each other, being spaced apart by a distance typically lying in the range 0.5 millimeters (mm) to 10 mm.

A second track 20 is formed on the second printed circuit 16. In this example, the second track 20 is etched on the second printed circuit 16. The second track 20 defines a second winding that presents a second axis of revolution coinciding with the axis of rotation X of the wheel 3.

The second printed circuit 16 also includes one or more second capacitors connected in series or in parallel with the second winding. The second winding and the second capacitors form a second transmission circuit.

In this example, the second processor unit 17 comprises electrical components that are mounted on the second printed circuit 16. The second processor unit 17 includes in particular a second transceiver.

The second processor unit 17 is connected by a third cable 21 to the pressure sensor 15.

There follows a description of how the measurement device 1 operates to measure the pressure of the tire 2 of the wheel 3 and to transmit the pressure measurement data to the calculation means 8.

The first and second windings are coupled together electromagnetically to form a wireless communication channel 23. The first and second transmission circuits form a first resonant circuit having a certain resonant frequency, thereby serving to maximize inductive coupling between the first printed circuit 7 and the second printed circuit 16. The resonant frequency typically lies in the range 1 megahertz (MHz) to 20 MHz, and in this example it is equal to 13.56 MHz. This frequency of 13.56 MHz is used in particular by near field communication (NFC) technology.

The first resonant circuit is tuned by adjusting the capacitances of the first capacitors, the inductance of the first winding, the capacitances of the second capacitors, and the inductance of the second winding. The adjustment takes account in particular of the distance between the first printed circuit 7 and the second printed circuit 16, and of the distance between each winding and any other metal element (wheel cover 19, axle 4, rim of the wheel 3, etc.).

Figure 3:
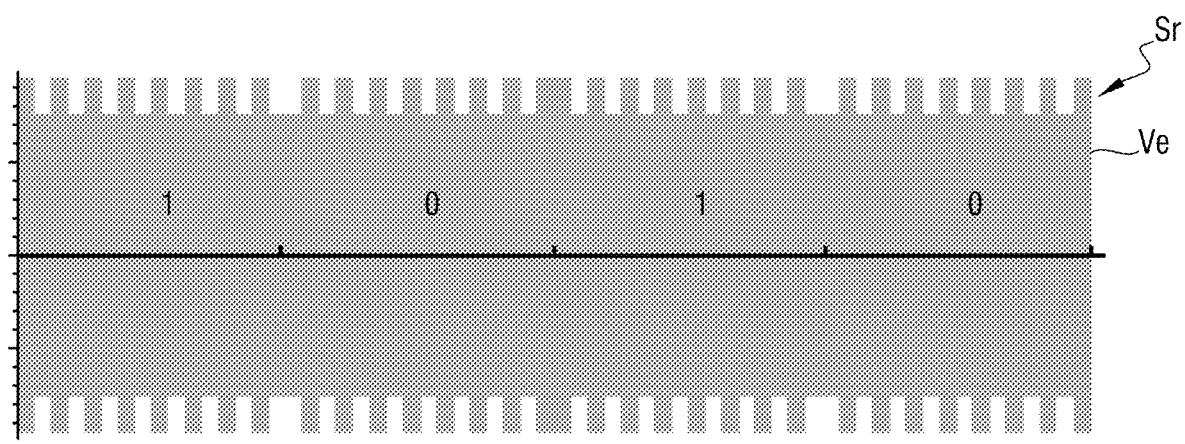
FIG. 3 plots excitation voltage across the terminals of the first winding (up the ordinate axis) as a function of time (along the abscissa axis), with the excitation voltage being modulated by a received signal.

With reference to FIG. 3, the first transceiver of the first processor unit 6 applies an excitation voltage Ve at the resonant frequency across the terminals of the first winding and thereby generates an excitation current that flows in the first winding.

Because of the electromagnetic coupling between the first and second windings, the excitation current generates an induced current that flows in the second winding. An induced voltage is thus produced across the terminals of the second winding.

The second processor unit 17 rectifies the induced voltage and converts it into a direct current (DC) power supply voltage that powers the second processor unit 17 and the pressure sensor 15. The second processor unit 17 and the pressure sensor 15 are thus electrically powered by the stationary portion 5 via the wireless communication channel 23.

Via the third cable 21, the second processor unit 17 acquires the pressure measurements, and then digitizes them in order to produce the pressure measurement data.

The second processor unit 17 then produces digital uplink data comprising the pressure measurement data possibly together with other data, e.g. built-in test (BITE) data concerning the second processor unit 17 and/or the pressure sensor 15.

The second transceiver of the second processor unit 17 then transmits the uplink data to the first processor unit 6 by modulating the input impedance of the second transmission circuit.

The impedance of the second transmission circuit is modulated by selectively connecting a particular second capacitor to the remainder of the second transmission circuit, or disconnecting it therefrom.

Connection has the effect either of matching or else of mismatching the impedance, depending on whether the impedance was adjusted to be matched with or without this particular second capacitor. Disconnection produces the opposite effect.

Mismatching the impedance of the second transmission circuit results in detuning of the first resonant circuit. Thus, modulating the impedance of the second transmission circuit has the effect of modulating the voltage that is induced across the terminals of the second winding, of modulating the impedance of the first resonant circuit, and thus also of modulating the amplitude of the excitation voltage Ve across the terminals of the first winding. A received signal Sr is thus superposed on the excitation voltage Ve across the terminals of the first winding and it modulates the excitation voltage Ve, said received signal Sr containing the uplink data.

By way of example, the modulation comprises binary phase shift keying (BPSK), thereby enabling data to be transferred with NFC type B technology. As can be seen in FIG. 3, transmitting a bit equal to 1 requires a first sequence of high states and of low states to be transmitted, and transmitting a bit equal to 0 requires a second sequence of high states and of low states to be transmitted.

A low state is emitted by detuning the second transmission circuit, while a high state is emitted without detuning the second transmission circuit.

The uplink data is thus transmitted to the stationary portion 5 by the second processor unit 17 via the wireless communication channel 23.

The first transceiver then demodulates the excitation voltage Ve and the received signal Sr in order to acquire the uplink data comprising the pressure measurement data.

The first processor unit 6 then transmits the pressure measurement data to the calculation means 8.

It is also possible for the first processor unit 6 to transmit downlink data to the second processor unit 17 via the wireless communication channel 23.

Figure 4:
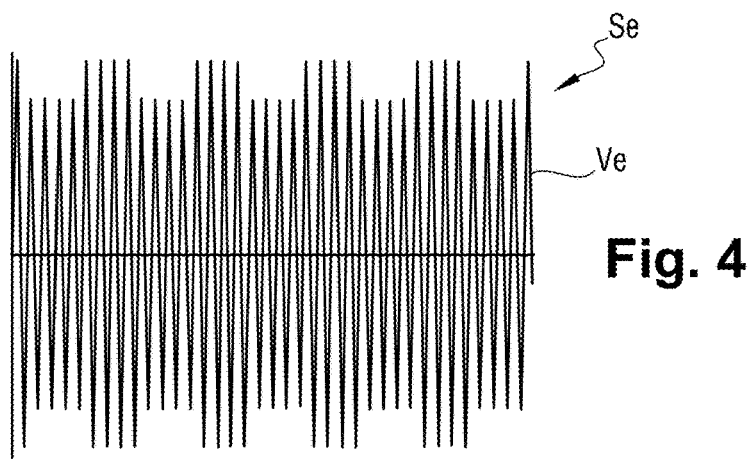
FIG. 4 plots excitation voltage across the terminals of the first winding as a function of time, the excitation voltage being modulated by an emitted signal.
Figure 5:
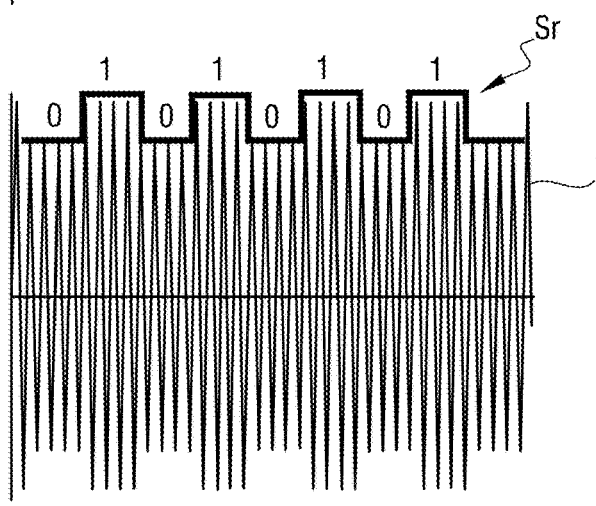
FIG. 5 shows voltage induced across the terminals of the second winding as a function of time, the induced voltage being modulated by a received signal.

FIGS. 4 and 5 show an example of performing such transmission. This time, the transmission does not make use of BPSK, but merely performs amplitude modulation.

The first transceiver of the first processor unit 6 modulates the impedance of the first transmission circuit in order to transmit an emitted signal Se containing the downlink data.

Mismatching of the impedance of the first transmission circuit results in detuning of the first resonant circuit. Thus, modulating the impedance of the first transmission circuit has the effect of using the emitted signal Se to modulate the excitation voltage Ve across the terminals of the first winding, to modulate the impedance of the first resonant circuit, and thus also to modulate the amplitude of the induced voltage Vi across the terminals of the second winding. A received signal Sr is thus superposed on the induced voltage Vi across the terminals of the second winding and modulates the induced voltage Vi, said received signal Sr containing the downlink data.

The second transceiver then demodulates the induced voltage Vi and the received signal Sr in order to acquire the downlink data. The second processor unit 17 thus receives the downlink data transmitted by the stationary portion 5 via the wireless communication channel 23 by modulating the impedance of the first transmission circuit.

The measurement device 1 also serves to measure the angular position and/or the angular speed of the wheel 3.

Figure 6:
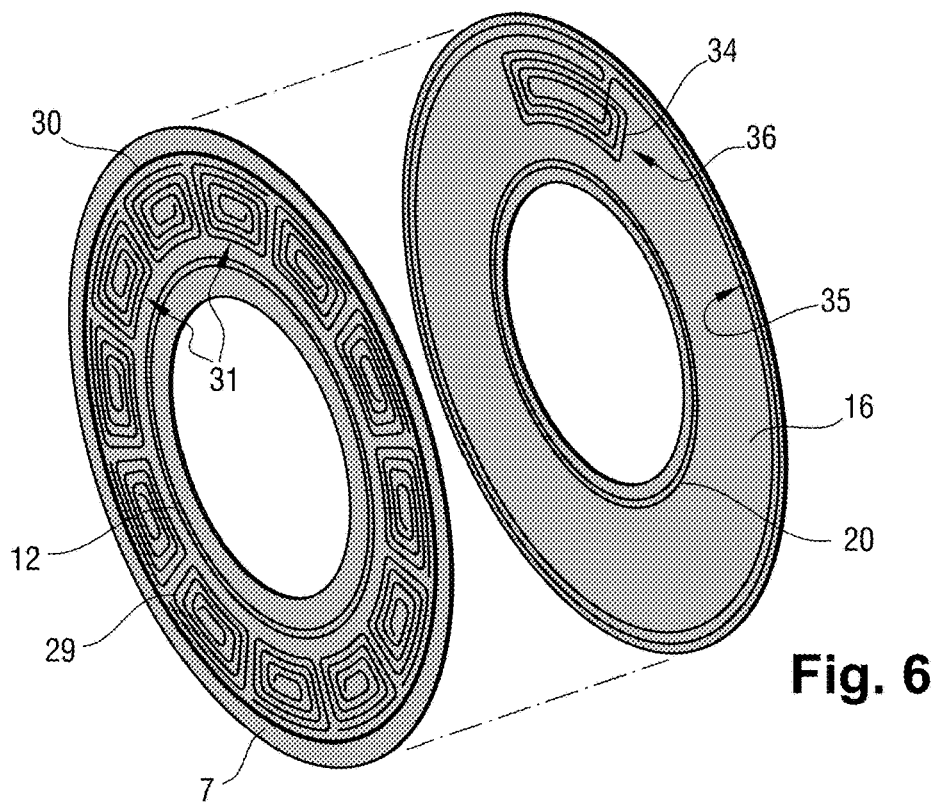
FIG. 6 shows a first printed circuit having a first track and third tracks formed thereon, and a second printed circuit having a second track and fourth tracks formed thereon.
Figure 7:
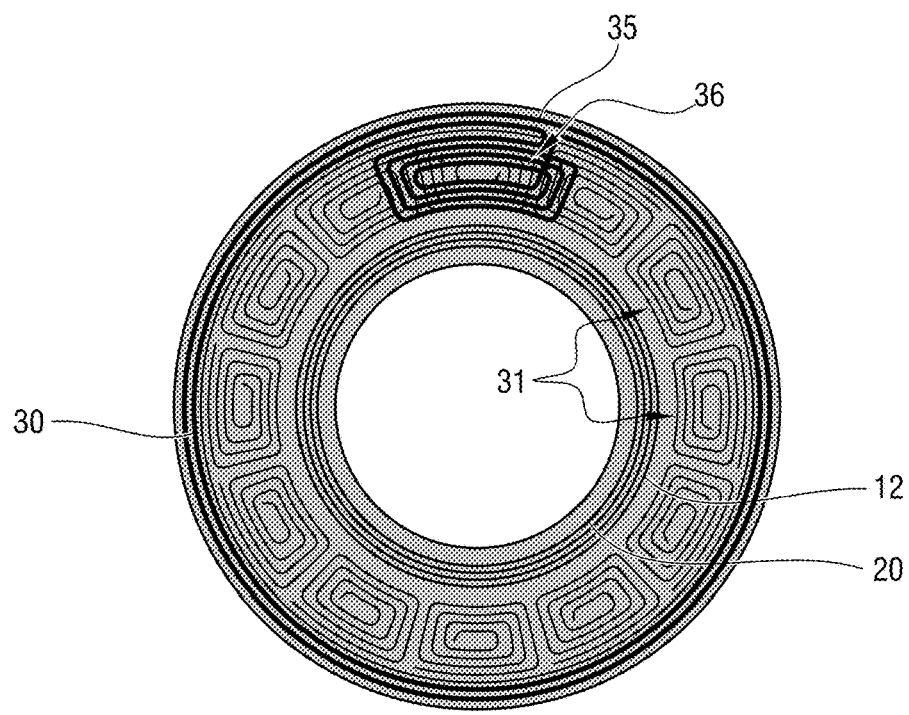
FIG. 7 shows the first track, the second track, the third tracks, and the fourth tracks in superposition.

With reference to FIGS. 6 and 7, the copper third tracks 29 are formed on the first printed circuit 7. In this example, the third tracks 29 are etched on the first printed circuit 7. The third tracks 29 define an emission pattern 30 and a plurality of measurement patterns 31, specifically twelve measurement patterns 31.

The emission pattern 30 lies in the proximity of a circumference of the first printed circuit 7, and the measurement patterns 31 are distributed angularly in a regular manner in the proximity of the circumference of the first printed circuit 7.

The emission pattern 30 presents an axis of revolution. When the measurement device 1 is installed on the undercarriage, its axis of revolution coincides with the axis of rotation X of the wheel 3, i.e. with the axis of the axle 4. In this example, the emission pattern 30 is a winding comprising a plurality of turns formed by a third track 29 of the first printed circuit 7. Each turn forms a circle of diameter close to the large diameter of the first printed circuit 7.

In this example, each measurement pattern 31 is a winding comprising a plurality of turns formed by a third track 29 of the first printed circuit 7.

The first processor unit 6 is connected to the emission pattern 30 and to the measurement patterns 31.

Fourth copper tracks 34 are formed on the second printed circuit 16. In this example, the fourth tracks 34 are etched on the second printed circuit 16. The fourth tracks 34 define a reception pattern 35 and a target pattern 36.

The reception pattern 35 lies in the proximity of a circumference of the second printed circuit 16, and the target pattern 36 is positioned in the proximity of the circumference of the second printed circuit 16. The reception pattern 35 and the target pattern 36 are connected together by fourth tracks 34.

The reception pattern 35 presents an axis of revolution that coincides with the axis of rotation X of the wheel 3, i.e. with the axis of the axle 4. In this example, the reception pattern 35 is a winding comprising a plurality of turns formed by a fourth track 34 on the second printed circuit 16. Each turn forms a circle of diameter close to the large diameter of the second printed circuit 16.

In this example, the target pattern 36 is a winding comprising a plurality of turns formed by a fourth track 34 on the second printed circuit 16.

The first processor unit 6 generates an excitation signal and excites the emission pattern 30 with the excitation signal. The excitation signal is an electrical signal alternating at high frequency. The first and second printed circuits 7 and 16 are coupled together electromagnetically in such a manner that when the emission pattern 30 is excited by the excitation signal, an induced signal is received by the reception pattern 35. The electromagnetic coupling is inductive coupling.

The induced signal comprises a current I(t) flowing in the reception pattern 35 and in the target pattern 36 of the second printed circuit 16.

In accordance with the Biot-Savart law, excitation of the target pattern 36 by the current I(t) produces a magnetic field B(t) at a point M in three-dimensional space:

$$\vec{B}(t) = \frac{\mu_0}{4\pi} \int_P I(t) \cdot \vec{dl} \wedge \frac{\vec{PM}}{PM^3} = \frac{\mu_0}{4\pi} I(t) \int_P \vec{dl} \wedge \frac{\vec{PM}}{PM^3}$$

This magnetic field B(t) causes an electromotive force to appear in each winding of the measurement patterns 31 of the first printed circuit 7 (Faraday's law and Lenz's law). The electromotive force appearing on each winding of the measurement patterns 31 is a function of the magnetic flux φ(t) passing through the winding:

$$e = -\frac{d\phi}{dt}$$

The magnetic flux through each winding is:

$$\phi(t) = \int\int_S \vec{B}(t) \cdot d\vec{S} = \frac{\mu_0}{4\pi} I(t) \cdot \int\int_S \int_P \left( d\vec{l} \wedge \frac{\vec{PM}}{PM^3} \right) \cdot d\vec{S};$$

where $\vec{S}$ is the surface vector normal to the winding.

By considering the system to be quasi-stationary, it is possible to calculate a set of $k$ values for each winding of a particular measurement pattern 31, which values correspond to $k$ different positions of the target pattern 36:

$$L_k = \frac{\mu_0}{4\pi} \cdot \int\int_S \int_P \left( d\vec{l} \wedge \frac{\vec{PM}}{PM^3} \right) \cdot d\vec{S}$$

These $L_k$ terms represent the mutual inductance between the winding of the target pattern 36 and the winding of the measurement pattern 31 depending on the positions of the target pattern 36.

The resultant electromotive force is thus:

$$e(t) = -L_k \cdot \frac{dI(t)}{dt}.$$

I(t) and e(t) are sinusoidal electrical magnitudes at the frequency f=ω/2π. The electromotive force measured on each winding of a measurement pattern 31 is thus:

$$e = -jL_k \cdot \omega I.$$

Thus, for a given current value and at a given frequency, $e$ is a function of the position of the target pattern 36 relative to the measurement pattern 31.

The first processor unit 6 acquires the measurement signals associated with all of the measurement patterns 31. Each measurement signal is an electromotive force.

Figure 8:
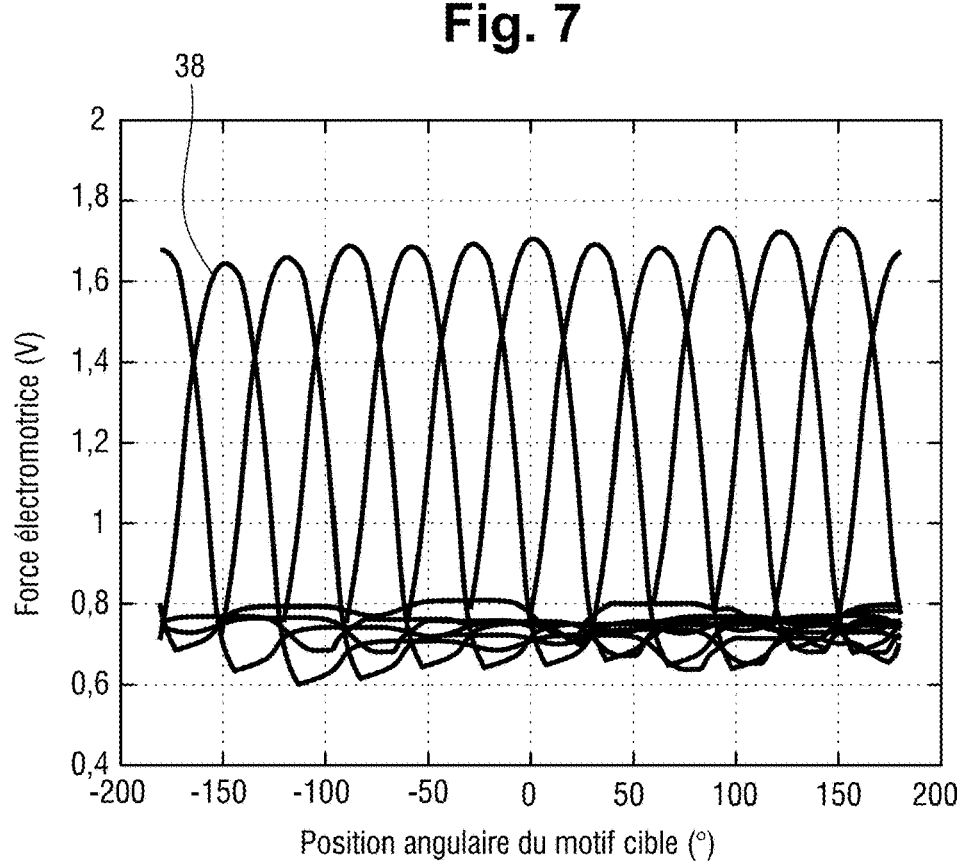
FIG. 8 is a graph containing curves representing measurement signals picked up by the measurement patterns of the measurement device.

In FIG. 8, it can be seen that the electromotive force measured for a given measurement pattern 31 depends on the angular position of the target pattern 36 and thus of the second printed circuit 16 relative to said given measurement pattern 31. Thus, by way of example, it can thus be observed that the curve 38 for the electromotive force measured for a measurement pattern 31 positioned at −150° increases while the angular position of the target pattern 36 is going towards −150°, reaches a maximum when the angular position of the target pattern 36 reaches −150°, and then decreases while the angular position of the target pattern 36 is going away from −150°.

After acquiring the measurement signals, the first processor unit 6 measures the amplitudes of the measurement signals and determines from among the measurement signals a first measurement signal picked up by a first measurement pattern 31. The first measurement pattern is the measurement pattern closest to the target pattern 36, and among all the measurement signals, the first measurement signal is the measurement signal that presents the greatest amplitude.

Determining which measurement pattern is the first measurement pattern and knowing the angular position of said first measurement pattern makes it possible to define the angular position of the target pattern 36 to within 2π/N, where N is the number of measurement patterns 31 (in this example, N=12). The angular position of each measurement pattern 31 can thus be estimated by the formula 2k·π/N, where $k$ is an index associated with said measurement pattern 31.

The first processor unit 6 then makes use of the angular position of the target pattern 36 in order to determine the angular position of the second printed circuit 16, the angular position of the wheel 3, and the angular speed of the wheel 3.

The measurement device 1 of the invention is thus capable both of measuring the pressure of the tire 2 of the wheel 3 and also of measuring the angular position and the angular speed of the wheel 3.

The transmission frequencies used for these functions are selected in such a manner as to avoid interference.

As mentioned above, the first resonant frequency that is used for measuring pressure is tuned to a resonant frequency of 13.56 MHz.

The windings used for measuring the angular position and the angular speed form a second resonant circuit that is tuned to a different resonant frequency. By way of example, a resonant frequency of 5 MHz is selected for the second resonant circuit. This selection makes it possible to reject the harmonics at 10 MHz and at 15 MHz of the angular speed measurement circuit from the passband of the pressure measurement circuit, around 13.56 MHz.

Naturally, the invention is not limited to the embodiment described, but covers any variant coming within the ambit of the invention as defined by the claims.

The measurement device of the invention may naturally be used on any type of wheel on any type of vehicle.

The first processor unit may be formed in full or in part on the first printed circuit, or it may be remote from the end of the axle, e.g. being situated entirely or in part in the fuselage of the aircraft. Likewise, the second processor unit may be formed entirely or in part on the second printed circuit, or it may comprise another electric circuit card situated in the proximity, e.g. on the wheel cover or on the sensor.

The first processor unit and the second processor unit may equally well be very complex or very simple.

For example, the second processor unit may comprise complex processor components (microcontroller, field programmable gate array (FPGA), etc.), an analog to digital converter, a complex transceiver, etc. However, the second processor unit could equally well be much simpler and adapted solely to modulating the impedance of the second transmission circuit on the basis of analog or digital pressure measurement data produced by the pressure sensor.

The invention claimed is:

1. A measurement device for measuring the pressure of a tire (2) of a wheel (3) mounted on an axle (4) of a vehicle, the measurement device comprising a stationary portion (5) for securing to the axle and a movable portion (14) for being driven in rotation by the wheel, the stationary portion comprising a first printed circuit (7) having at least one first track (12) formed thereon defining a first winding, the movable portion comprising a second printed circuit (16) having at least one second track (20) formed thereon defining a second winding, the second printed circuit being arranged to be connected to a pressure sensor (15), the first winding and the second winding being coupled together electromagnetically to form a wireless communication channel (23), the measurement device being arranged in such a manner that the pressure sensor is electrically powered by the stationary portion via the wireless communication channel (23), and in such a manner that uplink data comprising pressure measurement data is transmitted to the stationary portion (5) by the movable portion (14) via the wireless communication channel (23).

2. A measurement device according to claim 1, wherein the stationary portion (5) comprises a first transmission circuit comprising the first winding and wherein the movable portion (14) comprises a second transmission circuit comprising the second winding, the movable portion being arranged to modulate the impedance of the second transmission circuit in order to transmit the uplink data.

3. A measurement device according to claim 2, wherein the movable portion (14) is arranged to receive downlink data transmitted by the stationary portion (5) via the wireless communication channel (23) by modulating the impedance of the first transmission circuit.

4. A measurement device according to claim 2, wherein the first transmission circuit and the second transmission circuit are arranged to form a first resonant circuit having a resonant frequency equal to 13.56 MHz.

5. A measurement device according to claim 1, wherein the first winding and the second winding both present respective axes of revolution coinciding with an axis of rotation (X) of the wheel (3).

6. A measurement device according to claim 1, wherein third tracks (29) are formed on the first printed circuit (7) and wherein fourth tracks (34) are formed on the second printed circuit (16), the third and fourth tracks defining patterns, the measurement device being arranged by means of the patterns to produce a measurement signal representative of the angular position and/or of the angular speed of the wheel (3).

7. A measurement device according to claim 6, wherein the third tracks define at least one emission pattern (30) and at least one measurement pattern (31), wherein the fourth tracks define at least one reception pattern (35) at least one target pattern (36), the measurement device being arranged in such a manner that, when the emission pattern is excited by an excitation signal, an induced signal is received by the reception pattern and is then re-emitted by the target pattern, the measurement pattern then picking up the measurement signal representative of an angular position of the target pattern, and thus of the second printed circuit (16) of the movable portion and of the wheel (3).

8. A measurement device according to claim 7, wherein both the emission pattern and the reception pattern present respective axes of revolution coinciding with the axis of rotation of the wheel.

9. A measurement device according to claim 6, wherein the patterns are arranged to form a second resonant circuit having a resonant frequency equal to 5 MHz.

\* \* \* \* \*